United States Patent [19]  [11] 4,015,951
Gunnerman  [45] Apr. 5, 1977

[54] FUEL PELLETS AND METHOD FOR MAKING THEM FROM ORGANIC FIBROUS MATERIALS

[76] Inventor: Rudolf Wilhelm Gunnerman, 535 Haynes Ave., Beverly Hills, Calif. 90210

[22] Filed: Jan. 5, 1976

[21] Appl. No.: 646,514

[52] U.S. Cl. .............................. 44/10 E; 44/10 B; 44/10 H
[51] Int. Cl.² .......................................... C10L 5/00
[58] Field of Search ............... 44/1 E, 10 B, 10 R, 44/10 H, 10 A, 10 E

[56] References Cited

UNITED STATES PATENTS

| 43,112 | 6/1864 | Halsted et al. | 44/10 B |
| 959,870 | 5/1910 | McCan | 44/10 B |
| 1,102,591 | 7/1914 | von Kalitsch | 44/10 B |
| 2,475,769 | 7/1949 | Williams et al. | 44/10 R |

*Primary Examiner*—Carl F. Dees
*Attorney, Agent, or Firm*—Clelle W. Upchurch

[57] ABSTRACT

Pellets adapted to be burned in industrial applications are prepared by adjusting the particle size of organic fibrous material to not more than about 85% of the minimum dimension of the pellets to be produced, adjusting the moisture content of the fibrous particles to about 16% to about 28% by weight, pelletizing the particles into substantially symmetrical pellets having a maximum dimension of about one-half inch at a pressure whereby constituents of the particles exude and form a coating of wax-like material on the surface of the pellets, and adjusting the moisture of the pellets to a content which is in equilibrium with the atmosphere.

10 Claims, 2 Drawing Figures

FIG. 1
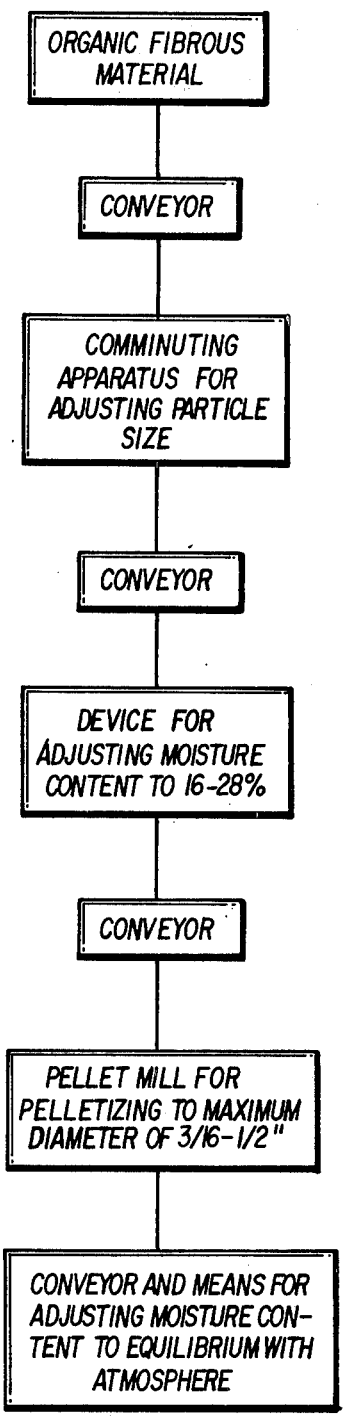
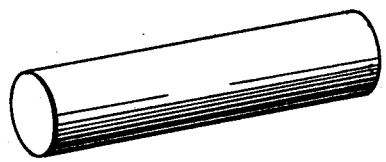
FIG. 2

FUEL PELLETS AND METHOD FOR MAKING THEM FROM ORGANIC FIBROUS MATERIALS

This invention relates generally to fuels and more particularly to fuel pellets adapted to be burned for industrial purposes prepared by forming organic fibers into substantially symmetrically shaped pellets of substantially uniform moisture content which burn efficiently without substantial ash build-up on the surface of the pellets.

As set forth in U.S. Forest Service Research Note FPL-090 entitled "Wood Fuel Preparation" by Reinke published by the U.S. Department of Agriculture, Forest Service, Forest Products Laboratory in January, 1965, wood has several inherent advantages as a fuel. Wood is a renewable fuel resource. Furthermore, it is widely distributed and accessible. It can be harvested with simple tools by unskilled labor and requires no elaborate equipment to locate, unearth, and process. Wood is relatively inexpensive when harvested on a spare-time basis or in conjunction with a regular logging operation. It will burn cleanly in many types of equipment under widely varying operating conditions, producing a minimum amount of ash (of some value as fertilizer). In open fires the flames of wood have an esthetic appeal.

Wood is readily kindled, and its burning rate can be regulated reasonably well if it is properly prepared and burned in suitable equipment. On the other hand, its moisture content is usually high and it normally requires piece-by-piece preparation, handling, and stoking, when used in the form of chunk wood and unhogged green scrap. In any form, it is bulkier than other common solid or liquid fuels.

The heavy demand for wood products has led to widespread interest in possible uses for residues that occur in nearly all operations in the wood-using industries. Wood residues such as sawdust, sander dust, shavings, twigs and the like are inevitably produced when making articles from wood because unlike plastics and metal, wood cannot be melted and molded to shape.

It has been proposed heretofore to shape these wood and other organic fibers into logs or pellets suitable for use as a fuel. For example, it is proposed to shape wood waste materials into briquettes in U.S. Forest Service Research Note FPL-75 entitled "Briquets From Wood Residue" published in November, 1964 by U.S. Department of Agriculture, Forest Service, Forest Products Laboratory. As stated in this publication, some granular materials require no added binder because they are self bonding when briquetted at elevated temperatures. Among these is wood. At temperatures above the minimum plastic temperature (325° F. for wood), the elastic strains set up in the material under briquetting pressure are completely relieved and the particle surfaces come together into intimate contact. Cohesion of the interfaces, interlocking of broomed-out, fibrous parts of the particles, and a possible adhesion of the heat-softened lignin (the natural bonding agent between the wood fibers), all contribute to a binding action that imparts satisfactory strength to briquets after they have cooled under pressure.

This self-bonding feature of wood waste is the basis of a wood-briquetting process commercially practiced in this country at present. Many plants practicing this process use a machine known as the "Pres-to-log," made by Wood Briquettes, Inc., Lewiston, Idaho. This machine operates by compressing the waste wood (sawdust, shavings, and other scrap ground to oatmeal size) into a primary compression chamber by means of a feed screw developing a pressure of approximately 3,000 pounds per square inch, the friction at this extreme pressure generating sufficient heat to produce the necessary plasticity for self-bonding. The molds are cylindrical holes 4 inches in diameter spaced at regular intervals in and extending through the rim of a large wheel about 12 inches wide, with the axes of the molds parallel to the axis of the wheel. The bottom of the mold cavity is closed by a hydraulically operated piston, which supplies the necessary resistance during filling and retracts as the mold fills. When the mold is filled, the mold wheel revolves slightly to bring the next mold cavity into line for filling. The mold wheel is water cooled, and the briquets are cooled below their plastic temperature by the time it makes a complete revolution. The cooled briquet is ejected from the mold as the resistance piston enters the mold cavity ahead of it preparatory to its filling.

The 4- by 12-inch briquets produced by this machine are suitable for hand firing but not for mechanical stoking. For stoker briquets, a different type of machine, which is available from the same company, extrudes the self-bonded material through a cluster of eight 1-inch round holes to form continuous rods. As these rods emerge from the extrusion head, they are cut into 1-inch lengths by rotating knives and yield pellets suitable for mechanical stoking.

A process for making fire logs from ligno-cellulosic particles such as sawdust is disclosed in U.S. Pat. No. 3,227,530. In accordance with the disclosed process, ligno-cellulosic particles containing at least 15 percent moisture are extruded through a die while allowing moisture to escape. The extrusion is conducted under pressure and temperature conditions which cause moisture to flash from the compacted mass as steam with disintegration of the particles. The disintegrated particles are immediately compacted and cooled while still under compression to form a strong circumferential skin from natural bonding agents in the ligno-cellulosic material. The cooled product normally contains from 20 to 25 percent moisture.

A process is disclosed in U.S. Pat. No. 3,492,134 for making tablets by pressing a mixture of wood powder or wood shavings and food smoking spices in a tabletting press. The comminuted material is pressed at pressures of 500 to 8500 kg/cm$^2$. The comminuted material is dried to a moisture content of 7 – 9% by weight prior to compressing in the tabletting press.

Other types of extrusion, briquetting and pelletizing machines and processes are available. However, the products of these machines and processes are not entirely suitable for the mechanically stoking of furnaces because they tend to shatter or disintegrate or do not burn efficiently without the production of an undesirable ash.

It is therefore an object of this invention to provide an improved process for shaping and compressing organic fibrous particles into pellets suitable for use in various types of furnaces as a fuel. Another object of the invention is to provide a process for making fuel pellets from organic materials such as wood or the like which will burn uniformly with substantially uniform calorietic output and without the production of significant quantities of sulfur and undesirable oxides of nitrogen. A further object of the invention is to provide an improved fuel pellet prepared by shaping and compressing particles of organic fibrous material which can be burned efficiently in commercial furnaces. Still another object of the invention is to provide a fuel pellet of organic fibrous material having a configuration and dimensions which can be fed to furnaces, ovens or the like with available stoking equipment ordinarily used for charging the furnace with coal.

Other objects will become apparent from the following description with reference to the drawing wherein FIG. 1 is a flow sheet illustrating one embodiment of the process of the invention; and FIG. 2 illustrates in a perspective view a representative pellet provided by the invention.

The foregoing objects and others are accomplished in accordance with this invention, generally speaking, by providing a process for pelletizing organic fibrous material into a form which adapts it to be burned substantially uniformly in a furnace which involves adjusting the particle size of the fibrous material to not more than about 85% of the minimum dimension of the pellet to be formed, adjusting the moisture of the fibrous material to a substantially uniform content of from about 16% to about 28% by weight, and shaping and compressing the fibrous material while at the adjusted moisture content into substantially symmetrical pellets having a maximum dimension of one-half inch or less. More specifically, the invention contemplates, as a preferred embodiment, a process for converting organic fibrous material into pellets suitable for burning as a fuel wherein organic fibrous material such as agricultural or wood waste materials are transported by a conveyor adapted to separate rocks, metal and other undesirable materials therefrom to a hammer mill where the organic fibrous material is ground to a substantially uniform particle size of not more than about 85% of the minimum dimension of the pellets to be formed therefrom, the ground material is then conveyed to a dryer where the moisture content is adjusted to from about 16 to about 28% water, and the product having the adjusted particle size and water content is then conveyed to a pelletizing machine equipped with its own measuring screw device for feeding the mass through the dies of the pellet mill and the resulting pellet is then dried until its moisture content is in equilibrium with the atmosphere. The fibrous material is produced at a pressure whereby the temperature of the pellet in the die is from about 325° to about 350° F. While the moisture content of most organic fibrous material will be above 28% by weight and will require drying, it is to be understood that if material having a moisture content below 16% is available for pelletizing, its moisture content should be adjusted by humidification or the like to a moisture content between about 16 and about 28% before pelletizing. As broadly contemplated by the invention, the moisture content may be within the broad range of about 16 to 28% by weight but it has been found that the best results are obtained when the moisture content of the organic fibrous material at the time of pelletizing is between about 20% and 24% by weight so it is preferred that the moisture content be within this more limited range. The pellets may be dried by blowing air over them immediately after they emerge from the pellet mill.

It has been found that by adjusting the organic fibrous material particle size to about 85% or less of the minimum dimension of the pellet to be formed and adjusting the moisture content prior to compression to from about 16% to about 28% free water content, preferably about 20 to about 24%, a pellet having a protective wax-like surface formed by exudation from the fibrous material which will burn substantially uniformly without the formation of an undesirable ash is produced provided that the shaping and pressing is conducted at a temperature of from about 325° to about 350° F. In order that the burning rate of a mass of pellets will be substantially uniform, the pellets are dried after they have been formed to a substantially uniform moisture content which is in equilibrium with the surrounding atmosphere. The pellets can be used in firing of any type of industrial or domestic furnace. The pellets can be easily conveyed on commercially available inclined belt conveyors or with conventional stoking equipment. The pellets are of substantially uniform shape and dimensions and may be conveyed pneumatically if desired. Moreover, the fuel pellet may be ground for use in suspension firing of furnaces used in conjunction with electric power generator units or suspension fired boilers. It has been found that this ground pellet provides an efficient fuel for direct combustion in turbines. The amount of ash is so small and is so soft that it is non-abrasive to the metal of the turbine and its presence in the turbine is not objectionable.

It is preferred that the pellet be substantially cylindrical, parallelpiped or the like having a maximum cross-section within the range of from about one-eighth inch to about one-half inch. The actual pellet size is determined by the exterior surface area versus the composition of the material within the pellet. The maximum thickness of the pellet in any one direction should be not more than about one-half inch and will seldom be below about one-eighth inch. The absolute density of the pellet produced in accordance with the invention is above 65 pounds per cubic foot and often is about 90 pounds per cubic foot or higher at 8% moisture content. The density of the particles used to make the pellets is about 10 to 30 pounds per cubic foot at the same moisture content. The absolute density of a commercial Pres-to-log, on the other hand, is less than 65 pounds per cubic foot and thus lighter than water.

In order to provide maximum burning characteristics, it is necessary that a mass of fuel be of a substantially even pellet size and contain a substantially uniform moisture content throughout. It is undesirable and wasteful to burn industrially hog fuel because of the uneven particle size and its high moisture content. With these types of fuels it is necessary to use a high excess oxygen input which cools the fuel with a high BTU loss and inefficient burning.

Referring now to the drawing a pellet of the type illustrated in FIG. 2 is produced by the process illustrated in FIG. 1. A raw material of random particle size such as, for example, sawdust or other wood product waste and of non-uniform water content is conveyed through a conventional pneumatic conveyor to a hammer mill where the particle size is adjusted to a substantially uniform maximum dimension which is about 85% or less of the minimum thickness of the pellet to be produced. In the pneumatic conveyor rocks, metal and other foreign material are separated from the wood before it reaches the hammer mill. Any other type of conveyor which will tend to separate foreign material from the wood may be used but best results have been obtained so far with a pneumatic conveyor. The product from the hammer mill is conveyed to a rotary drum type dryer where the moisture content of the substantially uniformly dimensioned wood particles is adjusted to from about 16 to about 28% by weight free moisture. By "free moisture" is meant moisture which can be removed by evaporation at normal temperatures and does not include any water of crystallization that might be present in the fibrous material. After the particles have been adjusted to a moisture content of from about 16 to about 28% they are conveyed, preferably in a pneumatic conveyor, to a pelleting machine. Any suitable pelleting machine may be used such as, for example, the one produced by California Pellet Mill Company of San Francisco, Calif. In this apparatus, the material is fed into a hopper and pressed in dies having the desired configuration and shape. The pellet mill must be capable of producing a pressure in the die during compression which will cause the temperature of the fibrous material to increase to a point within the range of from about 325° to about 350° F. The California Pellet Mill, for example, exerts an applied pressure of about 40,000 pounds load at the impact point of the rollers. With some mills the pressure may be as low as 8,000 pounds load and pressures above 40,000 pounds may be used. Pressures within this range will produce the desired temperature during pelletizing. Wax-like materials in the ligno-cellulosic material will exude therefrom and form a surface skin on the pellet which protects the pellet from shattering and rapid change in moisture content when the fuel is used.

The pellets emerging from the pellet mill are spread over a rotating endless belt conveyor where fans blow air over them to adjust the temperature and moisture content thereof to approximately ambient. The product having the substantially uniform moisture content may then be stored safely or used immediately if desired. The equilibrium moisture content of the pellets will usually be within the range of from about 7 to 8% depending upon the humidity in the atmosphere.

As stated above, it has been found that waxes and other resinous materials in the ligno-cellulosic material forms a surface coating on the pellets which renders the pellets less susceptible to change in humidity while they are in storage or being transported. It is not necessary to add a binder material to the particles provided the pressure during pelletizing is sufficient to produce a temperature within the range of from about 325° to about 350° F. but if desired, organic materials such as waxes or the like may be added to the fibrous material to supplement the materials which exude from the particles.

A series of experiments were run to illustrate the importance of adjusting the moisture content of substantially uniformly dimensioned organic fibrous material particles to within the range of from about 20 to about 24% before pelletizing. In one set of experiments, Alder tree bark, hogged fuel, oak sawdust and Douglas fir sawdust were pre-dried to a moisture content of about 3 to 5% and chopped into a finely divided particle size. It was found that it was exceedingly hard and slow to make pellets and the production rate of a California pellet mill powered by a 2-horsepower motor would produce only about one pound of product every 15 minutes. This mill exerted a pressure of about 8,000 pounds at the impact points of the rollers. When bone dry straw was substituted for the wood it was found that the production rate was about the same. With Douglas fir about two pounds product were produced each 15 minutes but the pellets were so fragile they could not be handled. When only tree bark which was bone dry was used, it was possible to produce about six pounds of pellets per 15 minutes. However, these pellets were very brittle and could not be handled. It was observed that when the pellet size was about three-fourths inch, cracks and fissures developed in the product to a depth of from about 25 to 50%. In many instances, the pellets broke into ¼ inch sections or less.

It was found as the moisture content of the raw material was increased overall production would also increase. However, it was found that if the moisture content was within the range of from about 20 to about 24%, the California pellet mill powered by the 2-horsepower motor would produce product at a rate of about 1 to 1.3 pounds per minute or about 19½ to 20 pounds in 15 minutes. These pellets when the pressure was such that the temperature reached from about 325° to 350° F. had a density of about 1.5 and burned substantially uniformly without the formation of a detrimental ash on the surface of the pellet. The pellets burned with a substantially uniform production of BTU. If the moisture content was above 24% the productivity decreased and this decrease became substantial above 28% moisture.

It is impractical to dry the product from the hammer mill to a moisture content below about 20% but if material containing as little as 16% moisture is available it can be used. It takes about three times as long to reduce the moisture from 12 to 7% than it does to reduce the moisture from 40 to 20%.

It is essential that the maximum thickness or length of the pellets be about one-eighth inch to one-half inch. Otherwise the pellets cannot be dried to a substantially uniform moisture content within a commercially practical time. Moreover, pellets formed in accordance with this invention and having a maximum dimension of about one-half inch will burn substantially uniform and will develop from about 8,500 to 9,000 BTU per pound.

While it is most practical to form the pellets in a cylindrical shape, it is to be understood that the invention in its broadest aspects contemplates shaping the particles into any suitable symmetrical configuration. For example, the pellets may have the shape of a cube or may be parallelpiped shaped.

It is important that the pellets be dried to a uniform moisture content which is in equilibrium with the surrounding atmosphere before they are stored in large masses because the moisture content of pellets stored in large volumes will not become substantially uniform in any practical storage time. There will be a difference in moisture content between pellets in the center of a pile and those on the surface. For this reason, the invention contemplates drying the particles with air or the like while the pellets are spread out to a substantially uniform moisture content which is in equilibrium with the atmosphere, or to about 7 or 8% by weight.

Although the invention has been described in detail for the purpose of illustration it is to be understood that variations can be made by those skilled in the art without departing from the spirit and scope of the invention except as it may be limited by the claims.

What is claimed is:

1. A process for making fuel pellets from organic fibrous material which comprises adjusting the moisture content of comminuted fibrous material to from 16 to about 28% by weight, compressing the material in a die into a substantially symmetrical shape while at the said moisture content at a pressure whereby the temperature of the resulting pellet as it emerges from the die is from about 325° to 350° F. and drying the pellets to a moisture content which is approximately in equilibrium with the surrounding atmosphere.

2. The process of claim 1 wherein the organic fibrous material is comminuted in a hammer mill.

3. The process of claim 1 wherein fragments of organic fibrous material are conveyed in a pneumatic conveyor to a hammer mill where they are comminuted to a particle size of not more than about 85% of the minimum dimension of the pellet to be produced, the comminuted material is transported to a means for adjusting the moisture content to from about 20 to about 24% by weight, pelletized at a temperature of about 325° F. to about 350° F. and dried to a moisture content which is in approximate equilibrium with the surrounding atmosphere.

4. An uninterrupted process for making fuel pellets which comprises conveying fragments of organic fibrous material to a means for comminuting the fragments to a maximum dimension of 85% of the minimum dimension of the pellets to be produced, adjusting the moisture content of the resulting particles to from about 20 to about 24% by weight, pelletizing the particles at a temperature of from about 325° to about 350° F. to a density of above about 65 pounds per cubic foot, and adjusting the moisture content of the pellets to approximate equilibrium with the surrounding atmosphere.

5. A combustible organic fibrous pellet having a substantially symmetrical configuration with a maximum dimension in cross-section of not more than about one-half inch, a density above about 65 pounds per cubic foot and a substantially smooth protective surface coating of natural substances which have exuded from the organic fibrous material adapted to burn substantially uniformly and develop a BTU of from about 8,500 – 9,000 per pound.

6. The process of claim 1 wherein the resulting pellets have a maximum dimension in cross-section of about one-half inch.

7. The product of claim 5 wherein the maximum dimension in cross-section of the pellets is one-eighth to one-half inch.

8. The process of claim 1 wherein the pressure is about 8,000 pounds or higher.

9. The process of claim 4 wherein the maximum dimensions in cross-section of the resulting pellet is about one-half inch.

10. The process of claim 4 wherein the pellets are dried with heated air to a moisture content of about 7–8% by weight.

* * * * *